(12) United States Patent
Ikeda

(10) Patent No.: US 9,199,194 B2
(45) Date of Patent: Dec. 1, 2015

(54) HEATING DEVICE

(75) Inventor: Yuji Ikeda, Kobe (JP)

(73) Assignee: IMAGINEERING, INC., Kobe (JP)

( * ) Notice: Subject to any disclaimer, the term of this patent is extended or adjusted under 35 U.S.C. 154(b) by 0 days.

(21) Appl. No.: 14/345,551

(22) PCT Filed: Sep. 12, 2012

(86) PCT No.: PCT/JP2012/073381
§ 371 (c)(1),
(2), (4) Date: Oct. 21, 2014

(87) PCT Pub. No.: WO2013/039123
PCT Pub. Date: Mar. 21, 2013

(65) Prior Publication Data
US 2015/0064073 A1    Mar. 5, 2015

(30) Foreign Application Priority Data

Sep. 15, 2011 (JP) ................................ 2011-202187

(51) Int. Cl.
| | | |
|---|---|---|
| *H05B 6/80* | (2006.01) | |
| *B01D 53/86* | (2006.01) | |
| *F01N 3/20* | (2006.01) | |
| *H05B 6/68* | (2006.01) | |
| *F01N 3/028* | (2006.01) | |
| *H05B 6/64* | (2006.01) | |

(52) U.S. Cl.
CPC ............... *B01D 53/86* (2013.01); *F01N 3/028* (2013.01); *F01N 3/202* (2013.01); *H05B 6/6491* (2013.01); *H05B 6/686* (2013.01); *H05B 6/80* (2013.01); *H05B 6/802* (2013.01); *F01N 2510/00* (2013.01); *Y02T 10/26* (2013.01)

(58) Field of Classification Search
CPC ..... F01N 3/202; F01N 3/208; F01N 2510/00; B01D 53/86; H05B 6/686; H05B 6/802; H05B 6/6491; Y02T 10/26
See application file for complete search history.

(56) References Cited

FOREIGN PATENT DOCUMENTS

| | | |
|---|---|---|
| JP | 2010-169015 A | 8/2010 |
| WO | 2009-008525 A1 | 1/2009 |

OTHER PUBLICATIONS

Search Report issued in corresponding PCT application No. PCT/JP2012/073381, on Dec. 2012.

*Primary Examiner* — Kishor Mayekar
(74) *Attorney, Agent, or Firm* — Bacon & Thomas, PLLC

(57) ABSTRACT

The objective of the present invention is to reduce the loss in functionality due to the burn-out of micro-coils in a heating device, which uses micro-coils formed of carbon or molecules that include carbon as a principal component for heating a target object located in a space where high-temperature gases flow. The present invention relates to a heating device comprising: a heat producing layer having a micro-coil formed of carbon or molecules that include carbon as a principal component, where the heat producing layer is installed together with the target object located in a target space where high-temperature gases flow; and an electromagnetic (EM)-wave-emitting device that emits EM radiation into the target space. The target object is heated by producing heat in the micro-coil by EM radiation from the EM wave emitting device emitted to the target space. The heating device further comprises a covering layer, which coats the entirety of the heat producing layer.

3 Claims, 5 Drawing Sheets

HEATING DEVICE

TECHNICAL FIELD

The present invention relates to a heating device that heats a target object by producing heat in a material that absorbs electromagnetic (EM) radiation.

BACKGROUND

Technologies for heating a target object by producing heat in an EM wave absorber using EM radiation are known.

For example, JP 2009-036199A1 discloses a technology that heats a filter for capturing particulate matter in exhaust gases by producing heat in a material by absorbing microwave radiation. The microwave absorbing material is attached to the particulate filter. A carbon micro-coil formed of coil-shaped carbon fiber is described as an example of a material that absorbs microwave radiation.

PRIOR ART DOCUMENT

Patent Document

Patent Document 1: JP 2009-036199A1

SUMMARY OF INVENTION

Problems to be Solved

A micro-coil is installed together with the target object to form a heating device that uses the micro-coil, which is formed of carbon or molecules that include carbon as a principal component, to heat a target object located in a space where a high-temperature gas flows. Therefore, when an object, such as a particulate filter exposed to the high-temperature gas becomes heated, the micro-coil is also exposed to the high-temperature gas. The micro-coil, which is formed of carbon or molecules that include carbon as a principal component, may ignite because of the high temperatures of the exhaust gases. This may cause the micro-coil to burn out, so that the target object may no longer be heated.

The present invention is in view of this respect. The objective of the present invention is to reduce the degradation resulting from burn-out of the micro-coil in a heating device, which uses a micro-coil formed of carbon or molecules that include carbon as a principle component, for heating a target object located in a space where high-temperature gases flow.

Means for Solving the Problem

The first invention comprises a heat producing layer having a micro-coil formed of carbon or molecules that include carbon as a principle component, where the heat producing layer is installed together with the target object located in a space where high-temperature gases flow, and an EM-wave-emitting device that emits EM radiation in the target space. The target object is heated by producing heat in the micro-coil by EM radiation emitted from the EM-wave-emitting device to the target space. The heating device further comprises a covering layer, which covers the entire region of the heat producing layer.

In the first invention, significant quantities of oxygen are prevented from reaching the heat producing layer, since it is equipped with a covering layer, which coats the entirety of the heat-generating material. Furthermore, the increase in the temperature of the heat producing layer is controlled because the heat producing layer is not directly exposed to the high-temperature gases.

The second invention relates to the first invention, wherein the target object is a catalyst that purifies the high-temperature gases, and wherein a catalyst is installed in the covering layer.

The third invention relates to the second invention wherein the micro-coil is not in contact with the catalyst on the boundary surface of the covering layer and the heat producing layer.

In the third invention, the micro-coil is not in contact with the catalyst. Therefore, oxidization of the micro-coil by the catalyst is inhibited.

The fourth invention relates to one of the first to third inventions, wherein the emission of the EM radiation by the EM-wave-emitting device is controlled such that the temperature of the micro-coil does not reach the ignition temperature of the micro-coil.

In the fourth invention, the temperature of the micro-coil is prevented from reaching the ignition temperature.

The fifth invention comprises a heat producing layer having a micro-coil formed of carbon or molecules that include carbon as a principle component, where the heat producing layer is installed together with the target object located in a target space where the high-temperature gases flow, and an EM-wave-emitting device that emits EM radiation to the target space. The target object is heated by producing heat in the micro-coil by EM radiation from the EM wave emitting device emitted to the target space. The micro-coil is made of silicon carbide as a principle component.

In the fifth invention, the micro-coil, made of silicon carbide as a principle component which is heat-resistant and chemically stable, is used to heat the target object. This micro-coil does not burn out easily, even if it is installed together with the target object located in a space where high-temperature gases flow.

Advantage of the Present Invention

In the present invention, significant quantities of oxygen are prevented from reaching the heat producing layer because the covering layer coats the entirety of the heat producing layer. Furthermore, the increase in temperature in the heat producing layer is controlled because the heat producing layer is not exposed directly to the high-temperature gases. Thus, the micro-coil in the heat producing layer is not in contact with oxygen and is prevented from reaching the ignition temperature. Therefore, the micro-coil in the heat producing layer is prevented from burning out, and degradation of the heating device can therefore be reduced.

In the third invention, the micro-coil is not in contact with the catalyst, and oxidization of the micro-coil by the catalyst is prevented. As a result, micro-coil is not damaged by the contact with the catalyst, and the longevity of the heating device can thereby be extended.

In the fourth invention, emission of the EM radiation is controlled such that the temperature of the micro-coil does not reach the ignition temperature of the micro-coil. Therefore, the micro-coil in the heat producing layer is prevented from burning out, not only when the target object is exposed to the high-temperature gases, but also when the heat is produced in the micro-coil by the EM radiation. This reduces the degradation of the heating device due to the burnout of the micro-coil.

In the fifth invention, the micro-coil is formed primarily of silicon carbide, which is heat resistant and chemically stable, and is used for heating the target object. Therefore, the micro-coil is prevented from burning out, even if the micro-coil is installed together with the target object located in a space where the high-temperature gases flow, and degradation of the heating device is thereby inhibited.

DESCRIPTION OF THE PREFERRED EMBODIMENTS

The embodiments of the present invention are detailed with reference to the accompanying drawings. The embodiments below are the preferred embodiments of the invention, but are not intended to limit the scope of present invention and application or usage thereof.

Heating device 10 of this embodiment is a device that heats catalyst 32 (the target object) of exhaust-gas-purifier 30 that purifies the exhaust gas emitted from the engine of an automobile.

In this embodiment, catalyst 32 is an active metal such as platinum, palladium, or rhodium, which are the common principal components of a three-way catalyst system. The three-way catalyst system purifies hydrocarbons (HCs), carbon monoxide (CO), and nitrogen oxides ($NO_x$) contained in the exhaust gases of an automobile that uses gasoline as a fuel. The three-way catalyst oxidizes HCs to form water and carbon dioxide ($CO_2$), oxidizes CO to form $CO_2$, and reduces $NO_x$ to form nitrogen ($N_2$).

The three-way catalyst system is not effective at reducing $NO_x$ at low temperatures, and so is ineffective in this respect immediately following the startup of the engine in cold conditions. To function appropriately following cold-starting of the engine, the three-way catalyst system should be heated so that catalyst 32 can activate. In this embodiment, heating device 10 heats catalyst 32 to activate the catalyst.

Figure 1:
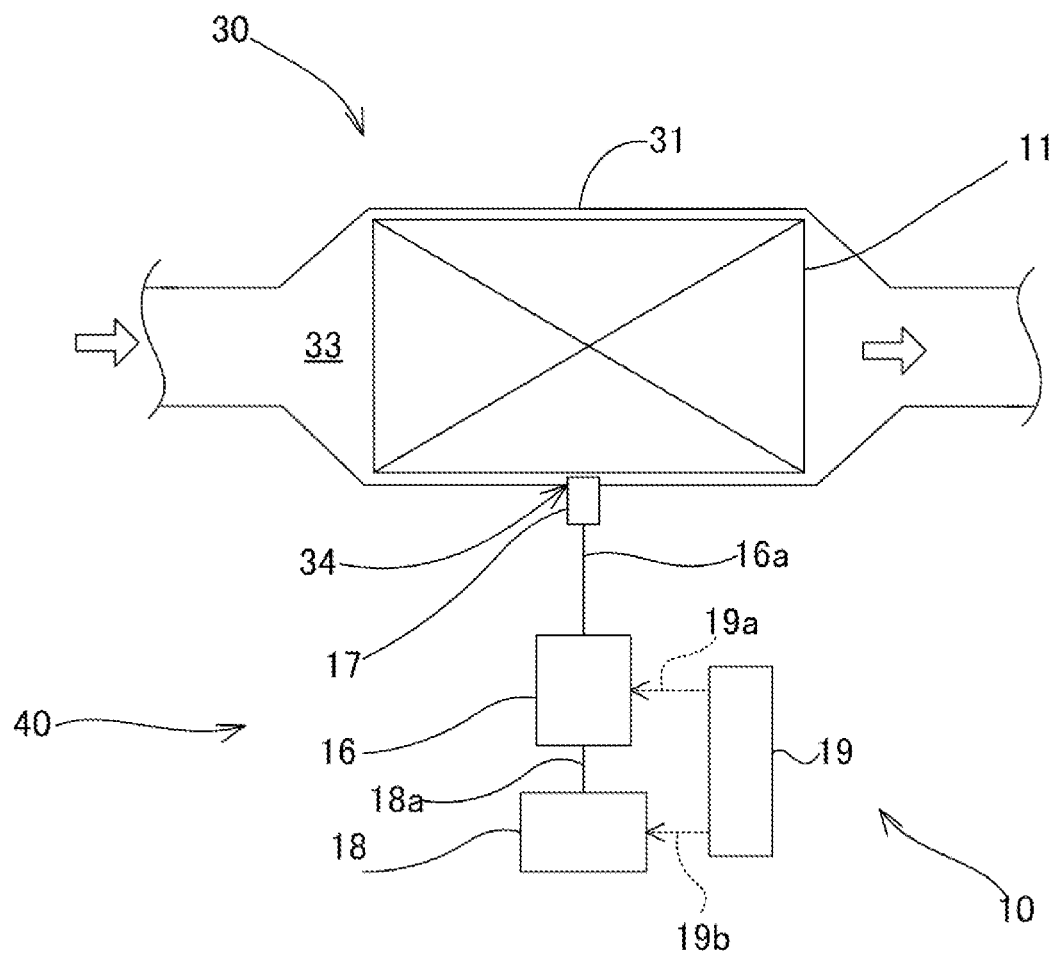
FIG. 1 illustrates an outline of the structure of an exhaust-gas-purifying device according to one embodiment.

As shown in FIG. 1, exhaust-gas purifier 30 has catalyst carrier 11 provided with catalyst 32; casing 31, which accommodates catalyst carrier 11; and heating device 10, which heats catalyst 32.

Figure 2:
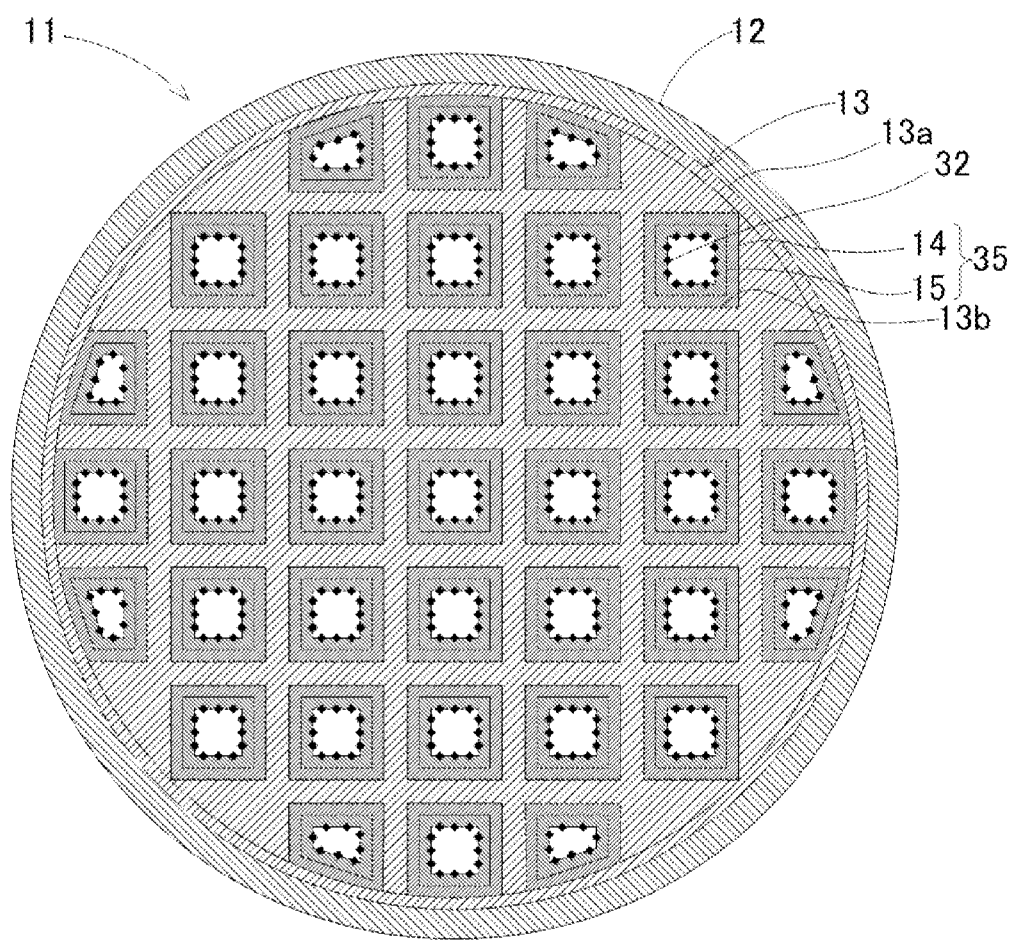
FIG. 2 shows a cross sectional horizontal view of the catalyst carrier according to one embodiment.
Figure 3:
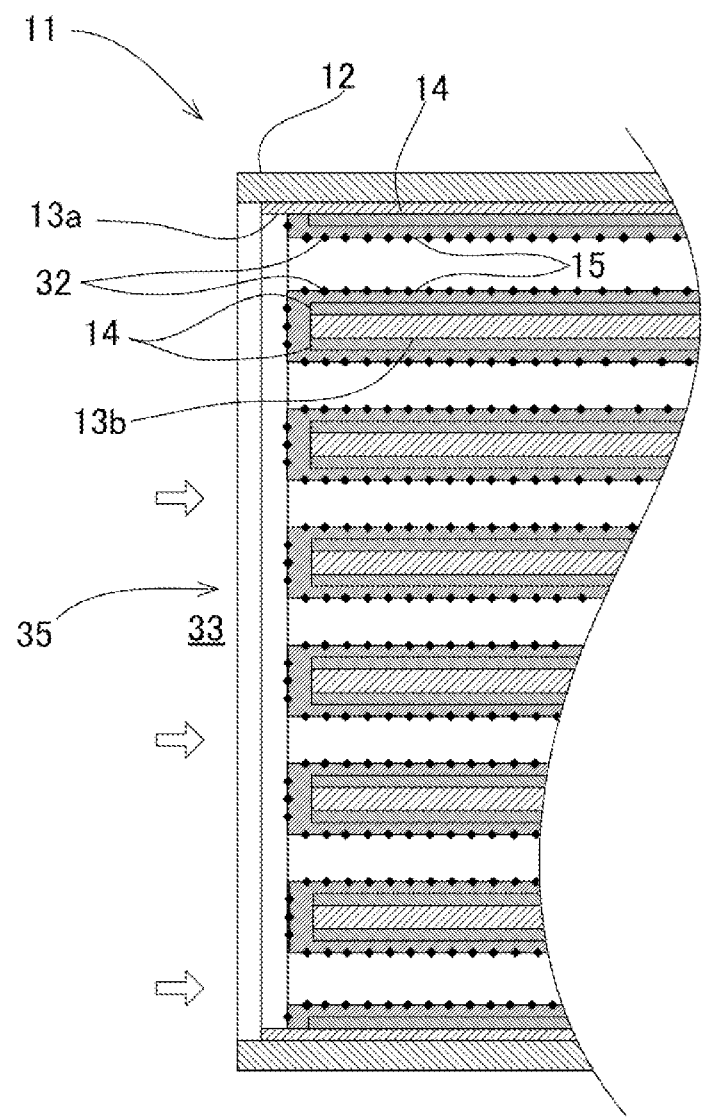
FIG. 3 shows a cross sectional vertical view of the catalyst carrier according to one embodiment.

As shown in FIGS. 2 and 3, the outer diameter of catalyst carrier 11 is almost identical to the inner diameter of casing 31. Catalyst carrier 11 is fixed inside casing 31 using a fixing material (not shown in the figure). Catalyst carrier 11 has outer cylinder 12, honeycomb structure 13, and catalyst-supporting layer 35.

Outer cylinder 12 is cylindrical and formed of an insulating material, which allow transmission of the microwave radiation. In this embodiment, outer cylinder 12 is formed of a ceramic material. Outer cylinder 12 accommodates honeycomb structure 13 which is described next.

Honeycomb structure 13 is cylindrical in shape and formed of an insulating material that allows transmission of the microwave radiation. In this embodiment, honeycomb structure 13 is formed of a ceramic material. Honeycomb structure 13 has cylinder 13a and lattice 13b, which is formed of a sectional lattice shape molded together with cylinder 13a. Honeycomb structure 13 is structured such that the exhaust gases can flow through the spaces between lattices 13b, as shown by the arrows in FIG. 3.

Catalyst-supporting layers 35 are laminated on cylinder 13a and lattice 13b of honeycomb structure 13, respectively, as shown in FIGS. 2 and 3. Catalysts 32 are supported on catalyst-supporting layer 35. A portion of catalyst-supporting layer 35, except for catalyst 32, consists a portion of heating device 10. Catalyst 32 is supported specifically on covering layer 15, supporting layers 35, which will be described later.

Casing 31 is cylindrical and formed of metal, and accommodates catalyst carrier 11. Casing 31 forms a portion of an exhaust tube of an automobile engine, and exhaust gases flow through in the direction shown by the arrows in FIG. 1. The inner part of casing 31 consists exhaust-gas passage 33 (i.e., the target space), through which the exhaust gases flow.

Opening 34 for inserting antenna 17 (described later) is formed near the lower center side of casing 31. Microwave radiation is emitted from antenna 17 in exhaust-gas passage 33 inside casing 31.

Heating device 10 is a device for heating catalyst 32 (the target object), supported on catalyst-supporting layer 35 of exhaust-gas purifier 30 described above. Heating device 10 has heat producing layer 14, cover layer 15, and EM-wave-emitting device 40.

Figure 4:
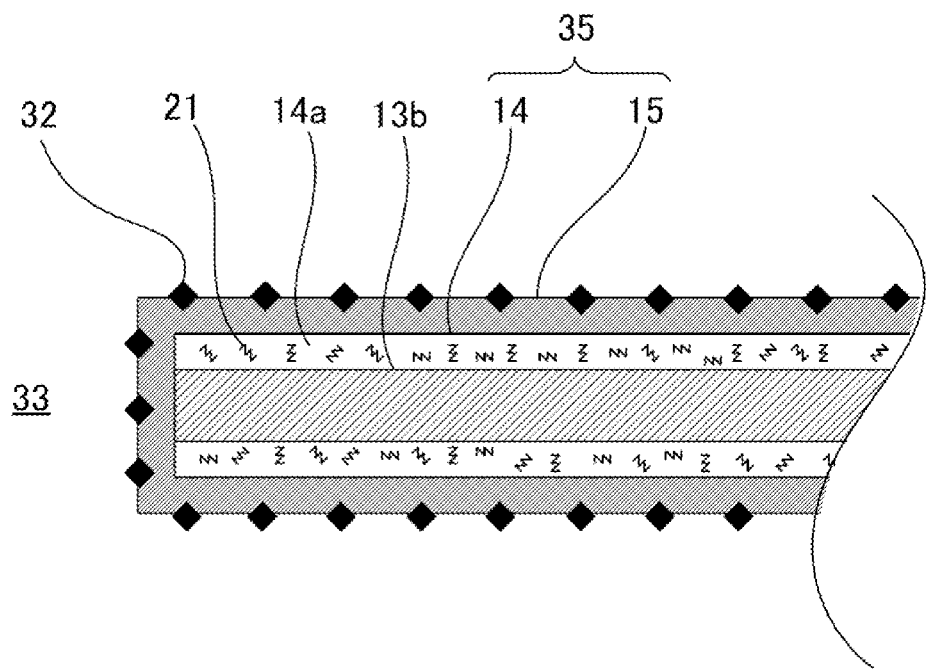
FIG. 4 shows a cross sectional vertical view of portion of the catalyst carrier according to one embodiment.

Heat producing layer 14 consists of a layer at the lower side of catalyst-supporting layer 35. Heat producing layer 14 is accommodated inside cylinder 13a and lattice 13b of honeycomb structure 13, as shown in FIGS. 2 and 3. In heat producing layer 14, a large quantity of micro-coils 21 are mixed with ceramic binder 14a, as shown in FIG. 4. Heat producing layer 14 is formed by applying a slurry solution, in which ceramic binder 14a and micro-coil 21 are mixed, to the surface of honeycomb structure 13, and is then baked together with honeycomb structure 13.

Micro-coil 21 is a carbon micro-coil (CMC), formed of carbon as the principle component. The CMC is a micro-structured carbon fiber formed of a coil that is rolled with a pitch of approximately 0.01-1 μm. A micro-coil made of silicon carbide as the principal component may be used as heat producing layer 14.

The CMCs produce heat by absorbing EM radiation. Using this characteristic, heat can be produced from micro-coil 21 by allowing microwave radiation from EM-wave-generating device 16 to be absorbed. Heat producing layer 14 and cover layer 15 installed on heat producing layer 14 (described later) are thereby heated. As a result, catalyst 32 supporting covering layer 15 is also heated.

Covering layer 15 consist a layer at the upper side of catalyst-supporting layer 35. Covering layer 15 is a non-ventilated heat-resistant layer formed of a ceramic binder material. Covering layer 15 covers the entirety of heat producing layer 14 to prevent oxygen from reaching heat producing layer 14. This also prevents the temperature of heat producing layer 14 from increasing when high-temperature gases flow through the spaces in honeycomb structure 13.

Covering layer 15 is formed by applying a ceramic binder material that supports catalyst 32 and heat producing layer 14, followed by a baking process. Thus, catalyst 32, which is the target object, is installed on the surface of covering layer 15.

The CMC may ignite spontaneously in air at temperatures in the range of 500-600° C. or more. The temperature of the exhaust gases from an automobile engine may reach temperatures in excess of 700-800° C. during full load. The temperature may reach 1000 degrees Celsius or more in an uphill or during acceleration.

Therefore, when the CMC is exposed directly to the exhaust gas that is more than the spontaneous ignition temperature, the CMC may ignite when it exceeds the ignition temperature. Thus, covering layer 15 coats the entirety of heat producing layer 14 where micro-coil 21 is installed in order to prevent oxygen from reaching heat producing layer 14, and to avoid heat producing layer 14 from being high temperatures.

EM-wave-emitting device 40 is a device that emits microwave radiation, which will be absorbed by micro-coil 21 of heat producing layer 14 in order to heat catalyst 32. EM-wave-emitting device 40 includes EM-radiation-generating device 16, antenna 17, power-supply unit 18, and controller 19.

EM-wave-generating device 16 generates microwave power using a semiconductor oscillator (not shown in the figure). EM-wave-generating device 16 generates microwaves when electrical power is supplied from power-supply unit 18 via power supply line 18a. The microwave power is transmitted to antenna 17 via microwave transmission line 16a.

Antenna 17 is for emitting microwave radiation using the signal from EM-wave-generation device 16 to exhaust-gas passage 33 inside of casing 31. Antenna 17 is inserted into opening 34 of casing 31, and antenna 17 is exposed to exhaust gases in passage 33 in casing 31.

Controller 19 is composed of an electronic control device that includes a central processing unit (CPU), memory, and an input/output (I/O) device. Controller 19 controls heating device 10, and is described below.

Operation of the Heating Device

The operation of heating device 10, including the operation of controller 19, is described below.

Controller 19 outputs an EM-wave-driving signal to power-supply unit 18 immediately following start-up of the automobile engine. Power-supply unit 18 supplies power to EM-wave-generating device 16 when the EM-wave-driving signal is received. The EM radiation generated by EM-wave-generating device 16 is then transmitted into exhaust-gas passage 33 inside casing 31 to antenna 17.

Micro-coil 21 of heat producing layer 14 produces heat and reaches an elevated temperature when micro-coil 21 absorbs the microwave radiation that is emitted into exhaust-gas passage 33 from antenna 17.

Heat producing layer 14 and coating layer 15 are heated rapidly by micro-coil 21 which is in high temperature. Catalyst 32 that is supported by coating layer 15 is thereby heated. As a result, catalyst 32 reaches the activation temperature quickly.

In this embodiment, heating device 10 is provided such that catalyst 32 is heated to 300-400° C. for activation. HCs, CO, and $NO_x$ contained in the exhaust gases are resolved at the surface of catalyst 32, which has reached the activation temperature. The purified exhaust gases are emitted to atmosphere through the exhaust passage (not shown in the figure), which is located at the downstream side.

Advantages of this Embodiment

In this embodiment, very little oxygen reaches heat producing layer 14 because the entirety of heat producing layer 14 is coated by covering layer 15. Furthermore, since heat producing layer 14 is not exposed directly to the high-temperature exhaust gases, the temperature of heat producing layer 14 is controlled when the high-temperature exhaust gases flow through the structure. Micro-coil 21 of heat producing layer 14 does not make contact with significant quantities of oxygen and so is prevented from igniting. This prevents micro-coils 21 of heat producing layer 14 from burning out, and thereby reduces degradation of heating device 10.

Since catalyst 32 and micro-coils 21 are not in contact, oxidization of micro-coil 21 by catalyst 32 is prevented. Thus, the longevity of heating device 10 can be extended because micro-coil 21 is not damaged by contact with catalyst 32.

Modification 1

In the first modification, micro-coil 21 of heat producing layer 14 is formed primarily of silicon carbide, which is heat-resistant and chemically stable. This reduces the degradation of heating device 10 because micro-coil 21 is prevented from burning out.

Modification 2

Figure 5:
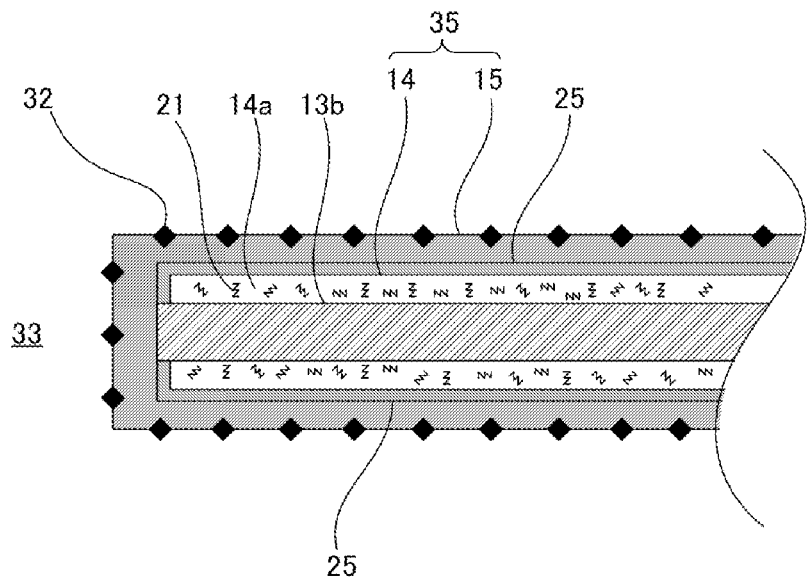
FIG. 5 shows a cross sectional vertical view of portion of the catalyst carrier according to a second modification.

In the second modification, an insulation layer formed of insulator 25 is installed between catalyst 32 and micro-coil 21 to prevent chemical reactions between catalyst 32 and micro-coil 21. As shown in FIG. 5, insulator 25 is deposited on heat producing layer 14. Catalyst 32 and micro-coil 21 are thereby preventing from being in contact.

In this modification, oxidation of micro-coil 21 by catalyst 32 is prevented because catalyst 32 and micro-coil 21 are not in contact due to the presence of insulator 25. Therefore, the micro-coil is not damaged due to contact with catalyst 32, and the longevity of heating device 10 may be extended.

Modification 3

Figure 6:
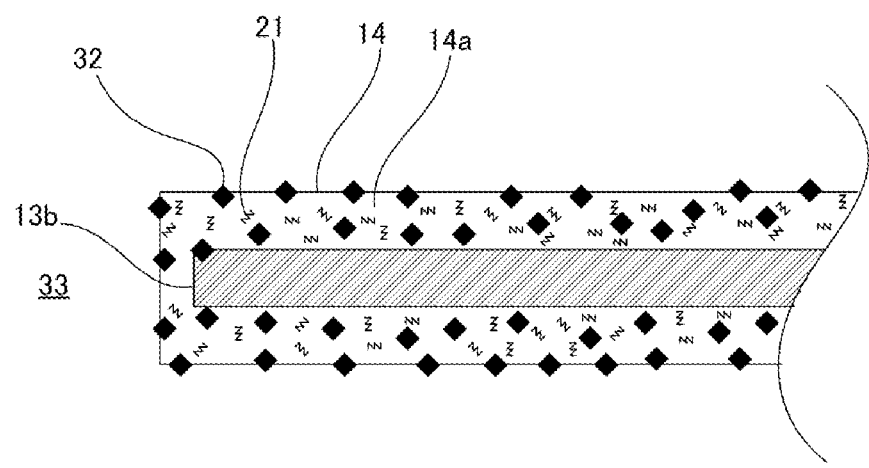
FIG. 6 shows a cross sectional vertical view of portion of the catalyst carrier According to a third modification.

Both micro-coil 21 and catalyst 32 may be installed on heat producing layer 14, as shown in FIG. 6, and covering layer 15 may be omitted when micro-coil 21 formed primarily of silicon carbide is used instead of a carbon micro-coil.

Micro-coil 21, formed of silicon carbide as the principle component, which is heat-resistant and chemically stable, is employed to heat catalyst 32. Micro-coil 21 is thereby prevented from burning out, even when it is installed together with catalyst 32, which is located in the space where the high-temperature exhaust gases flow. Degradation of heating device 10 is thereby inhibited. Micro-coil 21 is installed nearer to catalyst 32 compared with the main embodiment. Therefore, the temperature of catalyst 32 may be increased more rapidly.

Modification 4

In the fourth modification, the microwave radiation is controlled by EM-wave-emitting device 40 such that the temperature of micro-coil 21 does not reach the ignition temperature. Control device 19 determines a suitable time to terminate the EM radiation, which is based on the time required for micro-coil 21 to reach a predefined temperature, which is lower than the ignition temperature when EM-wave emitting device 40 continues to emit microwave radiation. The upper limit temperature may be equal to or less than 50° C.

When sufficient time has elapsed since the start of the emission of microwave radiation, which occurs immediately following the start-up of the engine, control unit 19 outputs an instruction to power-supply unit 18 to terminate the power supply to EM-wave-generating device 16. Power-supply unit 18 then terminates the power supply to EM-wave-generating device 16, and the emission of microwave radiation is terminated by EM-wave emitting device 40.

In the fourth modification, the emission of microwave radiation is controlled such that the temperature of micro-coil 21 does not reach the ignition temperature. Thus, micro-coil 21 can be prevented from burning out, not only during the period whereby catalyst 32 is exposed to the high-temperature exhaust gases, but also during the period while micro-coil 21 is heated by the microwave radiation.

Control device 19 may output the termination instruction to power-supply unit 18 based on the reading from a temperature sensor used to determine the temperature of heat producing layer 14.

Other Embodiments

The following embodiments can be contemplated.

Heating device 10 is not limited to heating catalyst 32 that purifies the exhaust gases of an automobile. The heating device may be applied to other types of catalyst installed in such a space where gases flow. For example, the heating device may be applied to heat a catalyst that purifies the exhaust gases of a combustion furnace or a burner reactor.

The shape of casing 31 or the location of opening 34 for receiving the microwave radiation are not limited to those described in the above embodiments. For example, casing 31 may be formed of a non-cylindrical shape. Opening 34 may be located at places other than as described above, such as above casing 31.

Catalyst 32 is not limited to those used for three-way catalysts. For example, it may also be applied to selective catalytic reduction (SCR), which requires an elevated temperature for activation.

Binder 14a of heat producing layer 14 does not have to be a ceramic binder, so long as it is heat resistant and can fix micro-coils 21 to honeycomb structure 13.

The binder for covering layer 15 does not have to be a ceramic binder. Other binders can be applied, as long as catalyst 32 can be fixed to heat producing layer 14 and can cover the entirety of heat producing layer 14.

A magnetron may be used as EM-wave-generating device 16 instead of a semiconductor oscillator, for generating microwave radiation.

Controller 19 may be used to control the microwave radiation to micro-coil 21 by controlling power-supply unit 18 prior to the startup of the automobile at a low-temperature environment. This allows the exhaust gases to be purified earlier.

The target objects may be other than catalyst 32, such as a sensor installed in the exhaust passage.

INDUSTRIAL APPLICABILITY

As discussed above, the present invention is useful for heating a device that heats a target object producing heat using a micro-coil by EM radiation, where a high-temperature gas flows in the target space.

EXPLANATION OF REFERENCE NUMERALS

10 Heating device
14 Heat producing layer
15 Covering layer
21 Micro-coil
25 Insulator
32 Catalyst (target object)
33 Exhaust-gas passage (target space)
40 EM-wave-emitting device

The invention claimed is:

1. A heating device comprising:
a heat producing layer formed of micro-coils made of carbon or molecules that include carbon as a principal component, where the heat producing layer is installed together with a target object located in a target space where high-temperature gases flow; and
an electromagnetic wave emitting device that emits electromagnetic wave in the target space; and
a covering layer that coats the entirety of the heat producing layer;
wherein the target object is heated by producing heat in the micro-coils by the electromagnetic wave from the electromagnetic wave emitting device emitted to the target space, and
the target object is a catalyst which purifies the high-temperature gases and the catalyst is installed in the covering layer.

2. The heating device as claimed in claim 1, wherein the micro-coil is not in contact with the catalyst at the boundary of the covering layer and the heat producing layer.

3. The heating device as claimed in claim 1, wherein the emission of the EM radiation by the EM-wave-emitting device is controlled such that the temperature of the micro-coil does not reach the ignition temperature of the micro-coil.

* * * * *